United States Patent [19]
Nahikian et al.

[11] 3,898,613
[45] Aug. 5, 1975

[54] VEHICLE FUEL ECONOMY METER

[75] Inventors: Edwin H. Nahikian, Sudbury;
Edward J. Goldman, Randolph;
Robert L. Brown, Foxboro, all of
Mass.

[73] Assignee: Foster-Miller Associates, Inc.,
Waltham, Mass.

[22] Filed: Apr. 11, 1974

[21] Appl. No.: 459,940

[52] U.S. Cl. ............ 340/52 R; 340/52 H; 340/262;
200/61.45 R
[51] Int. Cl. .......................................... H01h 35/06
[58] Field of Search ........... 340/52 H, 52 R, 62, 71,
340/72, 262; 200/61.45 R, 61.47, 61.52, 61.53

[56] References Cited
UNITED STATES PATENTS 3,258,746  6/1966  Bumpous ...................... 340/262 X
3,760,353  9/1973  Hassinger ........................... 340/72
3,763,484  10/1973  Byers .................................. 340/262

*Primary Examiner*—Alvin H. Waring
*Attorney, Agent, or Firm*—Morse, Altman, Oates & Bello

[57] ABSTRACT

A device for sensing and indicating the relative acceleration rate of a vehicle comprises a housing having an acceleration rate sensing switch carried by an adjusting member and an indicator operatively connected to the switch and a battery power source. The adjusting member is operative to position the switch for sensing vehicle acceleration rate above a given threshold level. When the vehicle acceleration rate exceeds the preset threshold level, the switch is actuated to its ON state and the indicator is energized for presenting an indication of excessive vehicle acceleration rate and increased fuel consumption.

15 Claims, 9 Drawing Figures

PATENTED AUG 5 1975

SHEET 1

3,898,613

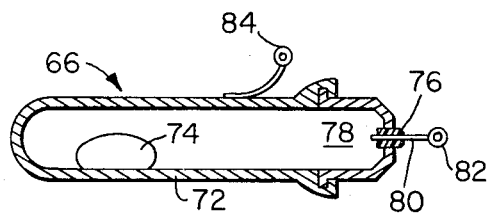
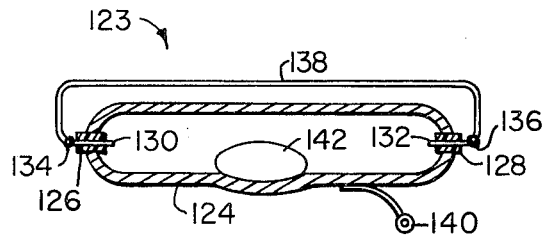
FIG. 6    FIG. 7
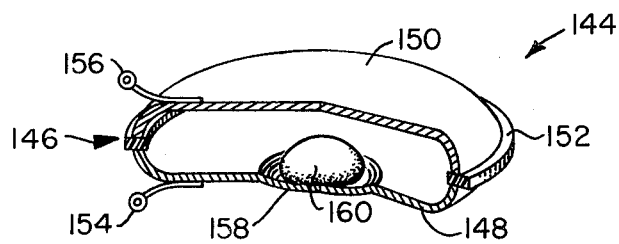
FIG. 8
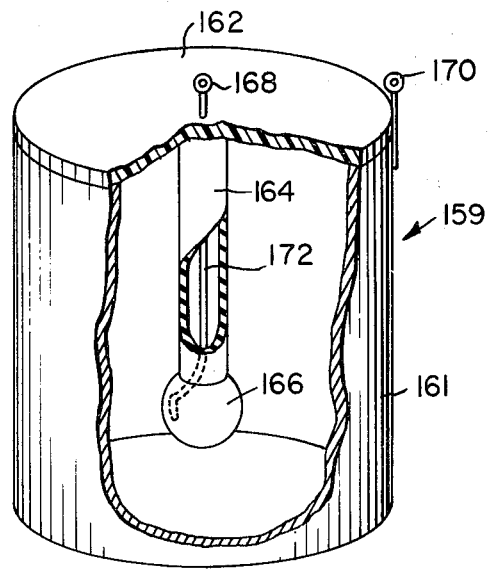
FIG. 9

VEHICLE FUEL ECONOMY METER

BACKGROUND OF THE INVENTION

1. Field of the Invention

The present invention relates to fuel economy devices and, more particularly, is directed towards a device for sensing and indicating vehicle acceleration.

2. Description of the Prior Art

Generally, motor vehicles operate most efficiently during periods of constant velocity and least efficiently during periods of high accleration. A need has arisen for a simple and inexpensive device for providing an indication that the economic acceleration rate of a vehicle is exceeded so that the operator may moderate the acceleration rate for minimizing fuel consumption. By accelerating moderately, the vehicle operator will realize an increase in fuel economy.

SUMMARY OF THE INVENTION

It is an object of the present invention to provide a simple and inexpensive device for sensing and indicating relative acceleration rate of a vehicle. The invention is characterized by a battery power device comprising a housing, an acceleration rate sensing switch and an excessive acceleration rate indicator. The switch is carried by an adjusting member which is rotatably mounted to the housing. The adjusting member, constrained for manual rotation and fixed against free rotation, is operative to bias the switch for sensing acceleration rates above an economical acceleration rate threshold level. The indicator and switch are interconnected with the battery in such a manner that the indicator is energized only when the switch is in a closed condition. When the vehicle acceleration rate exceeds the preset threshold level, the switch is actuated to its closed state and the indicator is energized for presenting an indication of excessive vehicle acceleration rate and increased fuel consumption.

Other and further objects of the resent invention will in part be obvious and will in part appear hereinafter.

The invention accordingly comprises the device possessing the construction, combination of elements, and arrangement of parts that are exemplified in the following detailed disclosure, the scope of which will be indicated in the appended claims.

BRIEF DESCRIPTION OF THE DRAWINGS

For a fuller understanding of the nature and objects of the present invention, reference should be had to the following detailed description taken in connection with the drawings wherein:

FIG. 6 is a cross section of the acceleration rate sensing switch of FIG. 3;

FIG. 7 is a cross section of an alternative embodiment of the sensing switch of FIG. 6 in the form of a bi-directional switch;

FIG. 8 is a perspective of an alternate embodiment of the sensing switch of FIG. 6 in the form of an omni-directional switch; and FIG. 9 is a perspective of an alternate embodiment of the omni-directional switch of FIG. 8.

DESCRIPTION OF THE PREFERRED EMBODIMENTS

Figure 1:
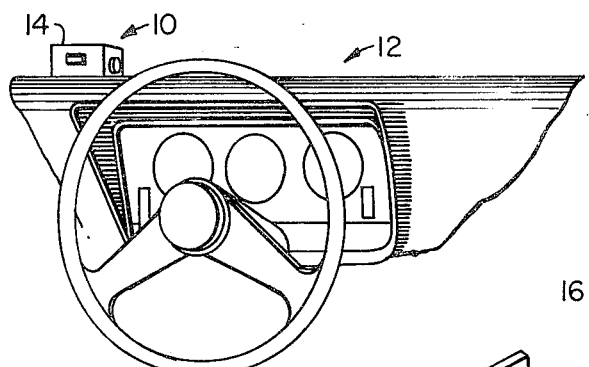
FIG. 1 is a perspective view of an economy fuel meter embodying the invention.

Referring now to the drawings, particularly FIG. 1, there is shown a fuel economy meter 10 for sensing and indicating relative vehicle acceleration rate above a predetermined threshold level. Typically, fuel economy meter 10 is mounted on the instrument panel of a motor vehicle, generally denoted at 12. In operation, when the vehicle acceleration rate exceeds the threshold level, fuel economy meter 10 emits a warning signal that indicates excessive acceleration rate and increased fuel consumption. At this point, the vehicle operator should moderate the acceleration rate until the warning signal ceases, an indication that the economical acceleration rate is no longer exceeded and fuel consumption is decreased.

Fuel economy meter 10 comprises a housing 14 in the form of a pair of substantially C-shaped frames 16 and 18. Frame 16 includes an upper wall 20, a lower wall 22 and a rear wall 24, the upper and lower walls being in spaced parallel relationship with one another and in perpendicular relationship with the rear wall. The inner forward margins of upper and lower walls 20 and 22 are formed with substantially triangular shaped flanges 26, and 28, respectively. Frame 18 includes sidewalls 30, 32 and a forward wall 34, the sidewalls being in spaced parallel relationship with one another and in perpendicular relationship with the forward wall. Frame 18 is formed with a partition 36 which extends from forward wall 34 in spaced parallel relationship with sidewall 30, the length of partition 36 being somewhat smaller than the length of sidewall 30. The height and width dimensions of frames 16 and 18 are such that frame 18 is received in frame 16 to form housing 14, the inner faces of flanges 26 and 28 operating to hold the frames together. The interior corner edges of frame 16 are notched at 38 to facilitate mating of the two frames. In the preferred embodiment, frames 16 and 18 are extrusions composed of a polymer which is sufficiently flexible to permit insertion of frame 18 into frame 16 and sufficiently rigid to retain the frames in the assembled position, for example, high impact polystyrene, polypropylene or polyvinyl chloride. Sidewall 32 and forward wall 34 are formed with apertures which are adapted to receive an adjusting member 40 and an indicator 42.

Figure 4:
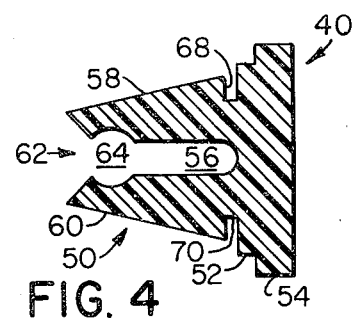
FIG. 4 is a cross section of the adjusting member taken along the lines 4—4 of FIG. 3.

As best shown in FIG. 4, adjusting member 40 comprises a forward shank portion 50, a medial flange 52, and a head 54 at its rearward end. A reentrant slot 56 is formed about the longitudinal axis of adjusting member 40 and extends throughout the length of shank portion 50 and into flange 52. Reentrant slot 56 operates to divide adjusting member 40 so that it defines a bifurcated member having a pair of opposing legs 58, 60 which are joined at head 54. The forward end of reentrant slot 56 is formed with a tapered entrance 62 which converges outwardly towards the forward end of shank portion 50. A cylindrical cavity 64, which is adapted to hold an acceleration rate sensing switch 66 (FIG. 6), is formed at a medial portion of reentrant slot 56, the longitudinal axes of cylindrical cavity 64 and adjusting member 40 intersect and are in perpendicular relationship. The periphery of shank portion 50 diverges rearwardly and outwardly to form a shoulder 68, an annular groove 70 formed between shoulder 68 and flange 52. Shoulder 68 and flange 52 cooperate to hold adjusting member 40 to sidewall 32. When adjusting member 40 is inserted into the aperture formed in sidewall 32, opposed legs 58, 60 are forced towards one another until the sidewall is engaged in annular groove 70. At this time, the opposed legs return to their original position, flange 52 and shoulder 68 disposed on opposite faces of sidewall 32. The fit between adjusting member 40 and sidewall 32 is sufficiently snug to prevent free rotation of the adjusting member and is sufficiently loose to allow manual rotation of head 54 which is operative as a knob or dial. In an alternative embodiment, particularly if economy meter 10 is mounted on a level surface, adjusting means is in a fixed orientation and is not rotatable. As hereinbefore noted and shown in FIGS. 2 and 3, acceleration rate sensing switch 66 is secured to adjusting member 40 within cavity 64.

In the illustrated embodiment of FIG. 6, acceleration rate sensing switch 66 is a unidirectional switch comprising a tubular casing 72 which is closed at one end and opened at an opposite end. The diameter of casing 72 is slightly larger than the diameter of cavity 64 so that there is a snug fit when switch 66 is inserted within the cavity. When acceleration rate sensing switch 66 is pressed into entrance 62, opposed legs 58, 60 are forced apart until the switch is received within cavity 64. At this time, the opposed legs return to their original position and press against casing 72, the longitudinal axes of cavity 64 and switch 66 being in coaxial registration. In an alternative embodiment, sensing switch 66 is secured to adjusting member 40 by means other than the press fit hereinbefore described, for example sensing switch is secured to adjusting member 40 by means of an adhesive cement or a fastening device. An electrical conducting fluid mass 74, for example a charge of mercury, is contained within casing 72 which is composed of an electrical conducting metal such as aluminum. A plug 76, composed of an insulating material such as a plastic, is fitted on the opened end of casing 72 to form a sealed chamber 78. An electrical conducting rod 80 having a terminal 82 is fixed within plug 76, a portion of rod 80 extending within chamber 78 and terminal 82 being available external to casing 72 for electrical connection. A terminal 84 is connected to casing 72. Rod 80 and casing 72 define two contact arms of switch 66 which has opened and closed states. When charge 74 contacts casing 72 and rod 80, an electrical conducting path is established therebetween and switch 66 is in the closed state. At other times, switch 66 is in the opened state and there is no electrical conducting path between casing 72 and rod 80.

Figure 2:
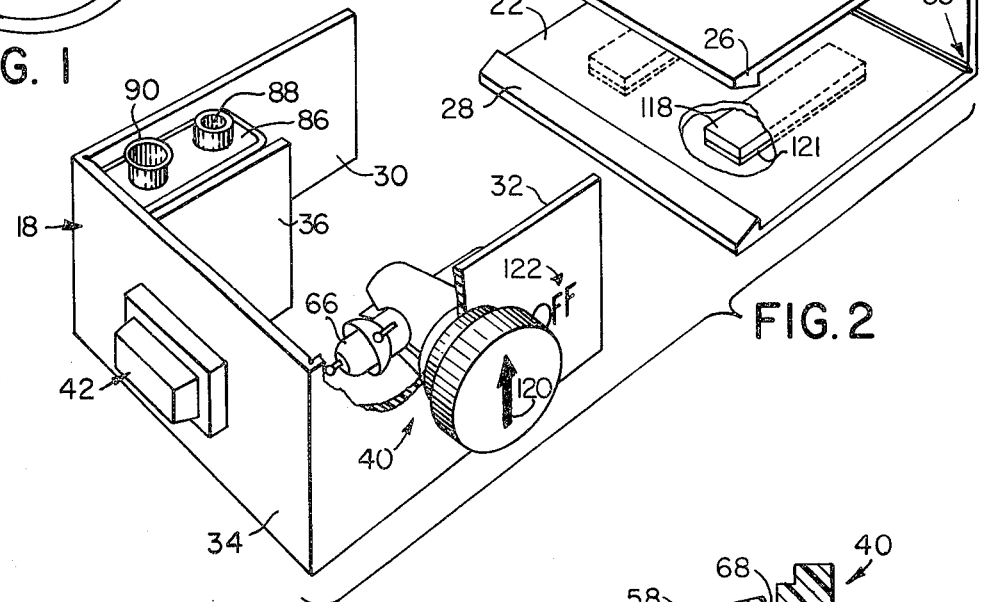
FIG. 2 is an exploded view in perspective of the economy fuel meter of FIG. 1.
Figure 3:
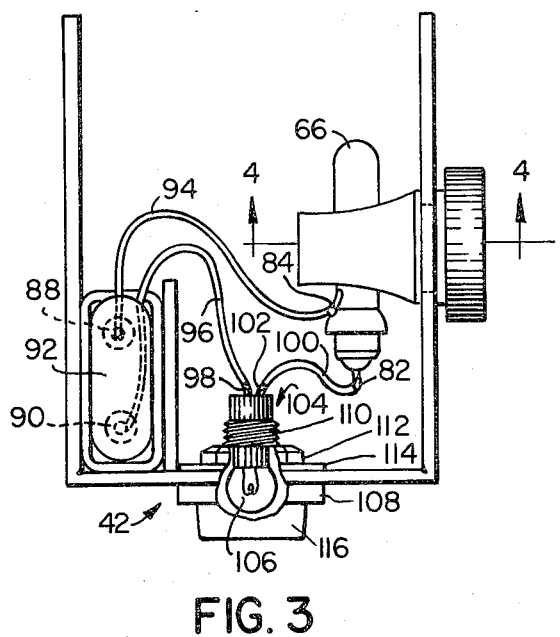
FIG. 3 is a top plan view of the economy fuel meter of FIG. 2.
Figure 5:
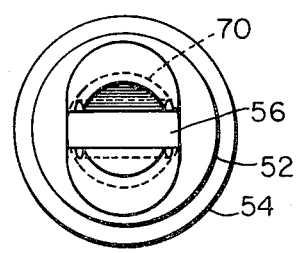
FIG. 5 is a front elevation of the adjusting member.

Referring now to FIGS. 2 and 3, it will be seen that fuel economy meter 10 is powered by a battery 86, for example a 9 volt transistor battery, which is secured between partition 36 and sidewall 30. In conventional manner, battery 86 is provided with a positive post 88 and a negative post 90 which are adapted for interconnection with a connector 92 having a pair of wires 94, 96. When connector 92 is assembled to battery 86, post 88 is in contact with wire 94 and post 90 is in contact with wire 96. The free end of wire 94 is connected to terminal 84 and the free end of wire 96 is connected to a terminal 98 of indicator 42. A wire 100 is connected between a terminal 102 of indicator 42 and terminal 82.

In the illustrated embodiment, indicator 42 is a visual indicator, for example a light emitting indicator comprising a socket 104 which is adapted to receive a light emitting device such as a lamp 106, electrical contact provided to lamp 106 through terminals 98 and 102. The forward end of socket 104 is formed with a flange 108 having a substantially rectangular profile, for example. A rearward portion 110 of socket 104 is externally threaded. The profile of flange 108 corresponds to but is somewhat larger than the profile of the aperture formed in forward wall 34, the threaded portion of socket 104 adapted to be inserted through the aperture. Indicator 42 is secured to forward wall 34 by turning a nut 112 onto threaded portion 110, flange 108 and a washer 114 pressing against opposite faces of the forward wall. A translucent cap 116 is removably mounted to flange 108 at a forward portion thereof. In alternative embodiments, indicator 42 is other than a visual indicator, for example an audio device such as a bell or a buzzer.

In operation, fuel economy meter 10 is mounted to instrument panel 12 and held thereto by means of a securing device such as a pair of adhesive pads 118 on the outer surface of lower wall 22. Adhesive pads 118 are provided with removable protective strips 121 having a releasable coating so that they may be readily removed to expose the adhesive surface of the pads. In alternative embodiments, fuel economy meter is mounted to panel 12 by means other than adhesive pads, for example magnetic devices. After fuel economy meter 10 is mounted on instrument panel 12, knob 54 which is provided with indicia 120 in the form of an arrow, for example, is rotated until the head of the arrow point towards indicia 122 such as the word OFF provided on sidewall 32. In this position, acceleration rate switch 66 is vertically disposed with insulated plug 76 nearest upper wall 20 and charge 74 at the closed end of casing 72. Knob 54 is rotated counter-clockwise until acceleration rate sensing switch 66 is in the closed state and lamp 106 is energized. Then, knob 54 is rotated clockwise until lamp 106 is deenergized, acceleration rate sensing switch being in the opened state. In this position, acceleration rate sensing switch 66 is oriented to provide a minimum threshold level and maximum sensitivity to vehicle acceleration rate. If knob 54 is further rotated clockwise, the threshold level increases and the sensitivity decreases. When the vehicle acceleration rate exceeds an economical level, charge 74 contacts casing 72 and rod 80, an electrical conducting path established between terminals 82 and 84. In consequence, acceleration rate sensing switch 66 is actuated to its closed state and indicator 42 is energized and provides a warning signal that the fuel consumption rate is excessive. If the vehicle acceleration rate does not exceed the economical acceleration rate, switch 66 remains in its opened state and indicator 42 is not energized. From the foregoing, it will be appreciated that adjusting member 40 operates to hold acceleration rate sensing switch 66 and to establish a preset threshold level for controlling the sensitivity of switch 66 in sensing the relative acceleration rate of the vehicle.

In alternative embodiments, acceleration rate sensing switch 66 is other than the unidirectional mercury switch herein before described, for example a multi-directional or an omni-directional switch. One embodiment of a multi-directional switch, for example a bi-directional switch, is shown in cross section in FIG. 7 at 123. Bi-directional switch 123 comprises a cylindrical casing 124 having plugs 126 and 128 at opposite ends. Casing 124 is composed of an electrical conducting material such as aluminum and plugs 126, 128 are comprised of an electrical non-conducting or insulating material such as plastic. A pair of rods 130 and 132 project inwardly and outwardly of plugs 126 and 128, respectively. The outwardly extending portions of rods 130 and 132 define terminals 134 and 136, respectively, that are interconnected by means of a conductor 138. A terminal 140 is connected to casing 124. The operation of switch 123 is similar to switch 66 with the exception that switch 123 is energized or in the closed state. When an electrically conducting mass 142, for example a charge of mercury, is in engagement with casing 124 and either rods 130 or 132, an electrical path being established between terminals 140 and 134 or between terminals 140 and 136. Bi-directional switch 123 is mounted in a manner similar to that described in connection with switch 66. It will be readily appreciated that bi-directional switch 123 is operative to sense excessive vehicle acceleration and deceleration rates.

One embodiment of an omni-directional switch is shown in FIG. 8 at 144. Omni-directional switch 144 comprises a housing 146 having a saucer shaped lower section 148 and an inverted saucer shaped upper section 150, the upper and lower sections are joined by a medial ring 152. Upper and lower sections 148 and 150 are composed of an electrical conducting material such as aluminum and medial ring 152 is composed of an electrical non-coducting or insulating material such as plastic. A terminal 154 is connected to lower section 148 and a terminal 156 is connected to upper section 150. Lower section 148 is formed with a depression 158 in which there is a conducting mass 160, for example a charge of mercury. Omni-directional switch 44 is mounted to adjusting member 40 so that conducting mass 160 is contained within depression 150, switch 144 being in the opened state. When the vehicle acceleration and deceleration rates as well as the vehicle turning rate exceeds a predetermined level, conducting mass 160 is forced against medial ring 152 and into contact with lower and upper sections 148 and 150, whereby an electrical path is established between terminals 154 and 156, switch 144 being in the closed state. It will be readily appreciated that omni-directional switch 144 is operative to sense excessive vehicle acceleration, deceleration and turning rates.

An alternative embodiment of an omni-directional switch is shown in FIG. 9 in the form of a pendulum switch 159 comprising a cylindrical housing 161 having a cover 162. One end of a resilient rod 164 is fixed to cover 162. A contactor 166 is attached to the other end of rod 164. A terminal 168, electrically insulated from housing 161, is mounted to cover 162 and a terminal 170 is mounted to housing 161, contactor 166 and terminal 168 being connected by means of a conductor 172. Housing 161 is composed of an electrical conducting material such as aluminum and cover plate is composed of a non-conducting material such as plastic. Resilient rod 164 is composed of an elastomer, for example, polyurethane or neoprene, and is characterized by a Shore durometer in the range of 50–80, preferably 70. Pendulum switch 159 is mounted to adjusting member 40 so that contactor 166 does not touch the interior surface of housing 161, switch 159 being in the opened state. When either the vehicle acceleration, deceleration or turning rate exceeds a predetermined level, contactor 166 swings towards and touches the interior surface of housing 161, whereby an electrical path is established betweeen terminals 168 and 170, switch 159 being in the closed state. Rod 164 is sufficiently flexible to allow contactor 166 to swing into contact with housing 161 when either the acceleration, deceleration or turning rate exceeds a predetermined level and is sufficiently rigid to prevent contactor 166 from touching housing 161 when the predetermined level is not exceeded.

Since certain changes may be made in the foregoing disclosure without departing from the scope of the invention herein involved, it is intended that all matter contained in the above-description and depicted in the accompanying drawings be construed in an illustrative and not in a limiting sense.

What is claimed is:

1. An electrically powered device for sensing uneconomical acceleration rate of a vehicle, said device adapted for interconnection with a power source, said device comprising:

a. a housing having an interior chamber, said housing formed with an opening that communicates with said interior chamber;

b. adjusting means movably mounted to said housing in said opening, said adjusting means extending within said interior chamber, said adjusting means being accessible exterior of said housing, said adjusting means constrained for manual rotation and fixed against free rotation;

c. switch means for sensing vehicle acceleration rate mounted to said adjusting means, said switch means disposed within said interior chamber, said switch means having opened and closed states, said adjusting means operative to position said switch means for establishing an acceleration rate threshold level, said switch means in said closed state when the vehicle acceleration rate exceeds said acceleration rate threshold level; and d. indicator means mounted to said housing, said indicator means having energized and deenergized states, said indicator means providing a warning signal when in said energized state;

e. an electrical path established between the power source and said indicator means when said switch means is in said closed state, said indicator means generating said wraning signal when said switch means is in said closed state, said indicator means electrically disconnected from the power source when said switch means is in said opened state.

2. The device as claimed in claim 1 wherein said switch means includes a casing having first and second terminals electrically insulated from one another, an electrically conducting mass contained within said casing, said mass operative to establish an electrical path between said first and second terminals when the vehicle acceleration rate exceeds said acceleration rate threshold level, said switch means in said closed state when said first and second terminals are electrically connected to one another through said mass.

3. The device as claimed in claim 2 wherein said electrically conducting mass is a charge of mercury and said switch means is mercury switch means.

4. The device as claimed in claim 1 wherein said adjusting means includes a shank portion, a medial flange and a head, a reentrant slot formed about a longitudinal axes of said adjusting means, said reentrant slot operative to divide said adjusting means into a bifurcated member having opposed legs joined at said head, a cavity formed in said shank portion, an axis of said cavity in substantially perpendicular relationship with a longitudinal axis of said reentrant slot, said cavity operative to captively hold said switch means.

5. The device as claimed in claim 1 wherein said housing includes mating first and second frames, said first frame having upper and lower walls and a rear wall, said first frame having a substantially C-shaped profile in right cross section, said second frame having opposed sidwalls and a forward wall, said second frame having a substantially C-shaped profile in right cross section.

6. The device as claimed in claim 5 wherein said second frame is formed with a partition between said sidewalls, said partition in spaced parallel relationship with said sidewalls and in perpendicular relationship with said forward wall, the power source held between said partition and one of said sidewalls.

7. A device for sensing and indicating acceleration rate of a vehicle, said device adapted for interconnection with a battery, said device comprising:
   a. a housing;
   b. adjusting means mounted to said housing, said adjusting means constrained for manual rotation and fixed against free rotation, said adjusting means including a shank portion, a medial flange and a head, a reentrant slot formed about a longitudinal axis of said adjusting means, said reentrant slot operative to divide said adjusting means into a bifurcated member having opposed legs joined at said head, a cylindrical cavity formed in said shank portion about a longitudinal axis of said slot, the longitudinal axes of said cavity and said slot intersecting in perpendicular relationship;
   c. switch means for sensing vehicle acceleration rate mounted to said adjusting means within said cylindrical cavity, said switch means including a casing having first and second terminals electrically insulated from one another, an electrically conducting fluid mass contained within said casing, said fluid mass operative to establish an electrical path between said switch means first and second terminals, said switch means having opened and closed states, said switch means in said closed state when said electrical path is established between said first and second terminals, said adjusting means operative to position said switch for establishing an acceleration rate threshold level, said switch means in said closed state when the vehicle acceleration rate exceeds said acceleration rate threshold level; and
   d. indicator means mounted to said housing, said indicator means having energized and deenergized states, said indicator means providing a warning signal when in said energized state;
   e. said switch means and indicator means operatively interconnected with the battery so that said indicator means is energized when said switch means is in said closed state and deenergized when said switch means is in said opened state.

8. The device as claimed in claim 7 wherein said electrically conducting fluid mass is a charge of mercury.

9. The device as claimed in claim 8 wherein said housing includes mating first and second frames, said first frame having upper and lower walls and a rear wall, said second frame having opposed sidewalls, a partition, and a forward wall, said partition disposed between said sidewalls, said partition in spaced parallel relationship with said sidewalls and in perpendicular relationship with said forward wall, the battery held between said partition and one of said sidewalls, the other of said sidewalls formed with an aperture adapted to receive said adjusting mounting means, said forward wall formed with an aperture adapted to receive said indicator means.

10. The device as claimed in claim 7 wherein said indicator mans is a light emitting device.

11. A battery powered device for sensing uneconomical acceleration rate of a vehicle, said device comprising:
   a. a housing having an interior chamber, said housing formed with an opening that communicates with said interior chamber;
   b. adjusting means mounted to said housing in said opening, said adjusting means extending within said interior chamber, said adjusting means being accessible exterior of said housing, said adjusting means constrained for manual rotation and fixed against free rotation;
   c. switch means for sensing vehicle motion mounted to said adjusting means, said switch means disposed within said interior chamber, said switch means having opened and closed states, said switch means in said closed state when the vehicle motion exceeds a predetermined level; and
   d. indicator means mounted to said housing, said indicator means having energized and deenergized states, said indicator means providing a warning signal when in said energized state;
   e. an electrical path established between the battery and said indicator means when said switch means is in said closed state, said indicator means generating said warning signal when said switch means is in said closed state, said indicator means electrically disconnected from the battery when said switch means is in said opened state.

12. The device as claimed in claim 11 wherein said switch means is unidirectional switch means.

13. The device as claimed in claim 11 wherein said switch means is bi-directional switch means.

14. The device as claimed in claim 11 wherein said switch means is omni-directional switch means.

15. The device as claimed in claim 14 wherein said omni-directional switch means is pendulum switch means.

* * * * *